(12) United States Patent
Blacquiere et al.

(10) Patent No.: US 7,487,387 B2
(45) Date of Patent: Feb. 3, 2009

(54) RECORDING MEDIUM DEFECT MANAGEMENT

(75) Inventors: Johannis Friso Rendert Blacquiere, Eindhoven (NL); Steven Broeils Luitjens, Eindhoven (NL); Dirk Hamelinck, Eindhoven (NL); Pope Ijtsma, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 589 days.

(21) Appl. No.: 10/527,852

(22) PCT Filed: Aug. 4, 2003

(86) PCT No.: PCT/IB03/03403

§ 371 (c)(1),
(2), (4) Date: Mar. 16, 2005

(87) PCT Pub. No.: WO2004/027775

PCT Pub. Date: Apr. 1, 2005

(65) Prior Publication Data

US 2005/0270943 A1    Dec. 8, 2005

(30) Foreign Application Priority Data

Sep. 19, 2002    (EP) ................... 02078877

(51) Int. Cl.
*G06F 11/00*    (2006.01)
(52) U.S. Cl. ................ 714/7; 714/8; 711/171
(58) Field of Classification Search ............ 714/7, 714/8; 711/171
See application file for complete search history.

(56) References Cited

U.S. PATENT DOCUMENTS

| | | | | |
|---|---|---|---|---|
| 6,385,148 B2 * | 5/2002 | Ito et al. | ................. | 369/47.14 |
| 6,453,384 B1 * | 9/2002 | Park et al. | ................. | 711/112 |
| 6,581,167 B1 * | 6/2003 | Gotoh et al. | ................. | 714/7 |
| 6,631,442 B1 * | 10/2003 | Blumenau | ................. | 711/112 |
| 7,206,268 B2 * | 4/2007 | Gotoh et al. | ................. | 369/47.14 |

FOREIGN PATENT DOCUMENTS

EP    1 014 365 A2    6/2000

* cited by examiner

*Primary Examiner*—Yolanda L Wilson
(74) *Attorney, Agent, or Firm*—Michael E. Belk

(57) ABSTRACT

A recording medium (D) comprises a file system area (FSA), a data area (DAA) and an initial defect management area (DMA). A system comprises a drive (DR) for writing data (DA) to or reading data (DR) from the data area (DAA) or the defect management area (DMA), and a host (H) for sending data (DA) to or for receiving data (DA) from the drive (DR) when the drive (DR) is in a mounted state wherein a file system (FS) in the file system area (FSA) is available to the host (H). The method of accessing such a recording medium (D) detects (S1) whether a shortage of free space in the defect management area (DMA) is to be expected, and if yes, allocates (S2) supplemental defect management area (SDMA) at the cost of the data area (DAA). The file system (FS) is adapted to reflect the latest state of available data area (DAA) and the allocated supplemental defect management area (SDMA). The file system (FS) is adapted during an adaptation period related to a mounting or an unmounting phase wherein the host (H) mounts or unmounts the drive (DR). The host (H) unmounts or releases the drive (DR) when no further data has to be exchanged between the host (H) and the drive (DR).

13 Claims, 6 Drawing Sheets

RECORDING MEDIUM DEFECT MANAGEMENT

The invention relates to a method of accessing a recording medium, an apparatus for accessing a recording medium, a computer program product for recording information, and a recording medium.

EP-A-1014365 discloses a recording medium on which a data area, a spare area for defect management, and management information of the spare area are allocated. The data to be stored on the recording medium is written in the data area. If during the writing or reading of data into the data area a critical state occurs, the defect area in which the critical state occurs is remapped to (part of) the spare area. This remapping, usually of ECC sectors, is recorded on the recording medium in a defect list. Thus, after the remapping, whenever the defective area is addressed, the defect list indicates the actual area where the information is stored instead of in the defective area.

A primary spare area is allocated for slipping replacement and linear replacement upon initializing of the recording medium. A secondary spare area is allocated for linear replacement after initialization of the recording medium. Both areas have a defect list. The primary spare area is used to cope with defective areas which are detected during the initializing (formatting) of the recording medium. The secondary area is used to cope with defects which occur during the use of the recording medium after the initializing. If the total spare area allocated in the primary and the secondary spare area is insufficient, a supplementary spare area is allocated. As long as the data area is not yet completely occupied by data, a recording medium on which relatively many defects occur can still be used. The sizes of the primary and the supplementary spare areas are determined by the number of defects generated upon initialization. The information on the sizes of the spare areas and the remainder state information representing the degree of use of the spare areas are recorded on the recording medium.

It is a drawback of the prior art that the size of the supplementary spare areas is determined during the initialization of the disc.

It is an object of the invention to provide a more flexible allocation of the supplemental spare areas.

A first aspect of the invention provides a method of accessing a recording medium. A second aspect of the invention provides an apparatus for accessing a recording medium. A third aspect of the invention provides a computer program product for recording information. A fourth aspect of the invention provides a recording medium. Advantageous embodiments are defined in the dependent claims.

In accordance with the first aspect of the invention, the method is suitable to use recording media which comprise a data area and an initial defect management area. The method is used in a system which comprises a drive for writing data to or reading data from the recording medium, and a host for sending data to or for receiving data from the drive when the recording medium is in a mounted state. In the mounted state, file system information (which may be present in the file system area and usually at least one supplemental file in the data area) on the recording medium is available to the host. Consequently, the host is able to write data to and/or to read data from the recording medium. The method of accessing such a recording medium detects whether a shortage of free space in the defect management area is to be expected, and if yes, allocates supplemental defect management area at the cost of the data area. Then, the file system is updated to reflect the latest state of available data area and the allocated supplemental defect management area. The file system is adapted during an adaptation period related to the mounting phase, or to an unmounting phase. In the mounting or unmounting phase, the host mounts or unmounts the recording medium, respectively. The host can unmount or release the recording medium when the user activates the eject button of the drive directly or via software, and no further data has to be exchanged between the host and the drive. The unmount action may also be initiated by software. In the unmounted state, the host has no information about the position of user data on the recording medium. The recording medium is unmounted, for example, every time the recording medium is removed from the drive or when the drive indicates to the operating system (further referred to as the OS) to unmount the medium.

In accordance with an aspect of the invention, the checking for sufficient free space in the defect management area already allocated, the allocation of supplemental defect management area, and the adaptation of the file system information is related to the mounting or the unmounting phase. The total amount of defect management area can be updated every time the recording medium is mounted or unmounted. The maximum amount of defect management area is not fixed a single time at initializing (formatting) the recording medium as occurs in the prior art. The allocation of supplemental defect management area during the mounting or unmounting phase enables to manage the defect management areas more flexible. If a recording medium contains a limited amount of data, a large total amount of defect management area can be allocated, much larger than the fixed amount in the prior art.

An advantage of increasing the supplementary spare area during or just before the mounting process or just after the unmounting process is that the OS need not be adapted to allow a change of the total amount of data area during normal operation when the drive is mounted under the OS. It is preferred to change the supplementary spare area during the unmounting process because the amount of available free space on the recording medium is exactly known and will not be changed during the mounting phase by writing data to or deleting data from the recording medium. This enables the recording medium to be used in drives which do not support the re-sizing itself. Preferably, the defect management resizing is not performed during the mounting phase as the OS wants to access the information on the recording medium as soon as possible.

It is possible that the drive, for example at regular intervals, starts a process of checking whether supplementary spare area has to be allocated and actually allocating this supplementary area and updating the file system information while the recording medium is still in the mounted phase. The drive responses with an error message at any attempt by the host to read data from or to write data to the recording medium.

The recording medium may be a recordable or a rewritable optical disc, the host may be a personal computer, and the drive may be an optical drive such as, for example, a CD or a DVD drive. The drive may be externally connected to the PC or may be part of the PC.

In an embodiment of the invention, the host, which usually is a PC, detects the expected shortage, allocates the supplemental spare area, and adapts the file system information accordingly, before the recording medium is unmounted. The intelligence is available in the host; the drive may be a standard drive.

In a further embodiment of the invention, the drive adapts the file system information after the host released or unmounted the recording medium. A special intelligent drive has to be used. It is an advantage that the tasks performed by the drive need not be performed by the host.

In a further embodiment of the invention, the host detects the expected shortage of defect management area to provide information to the drive about the state of the defect management area, for example the exact amount of or a percentage indicating the used or free space in the defect management area, or by keeping track of the number of replacements in the defect tables. Or, in the same manner as in EP-A-1014365, the usage of the defect management area is indicated by flags.

Further, the host detects the amount of free space in the data area which may be used to extend the defect management area. Both these aspects are communicated to the drive which uses this information to allocate the supplemental defect management area after the host unmounted the recordable medium. Again, it is an advantage that the drive is able to take over part of the activities from the host.

In an embodiment of the invention, after the host unmounted the recordable medium, the drive detects whether a shortage of defect management area is expected based on the evaluation of the DMA's recorded on the recording medium. Now, even more intelligence is available in the drive, which has the advantage that the activities required by the host to manage the supplemental defect management areas are minimal.

In an embodiment of the invention, the drive detects whether the shortage of defect management area is expected and, if so, communicates this to the host. The host decides on whether the defect management area is allowed to be enlarged and communicates its decision to the drive. If the defect management area has to be enlarged, the drive will do so, by first checking the file system on the recording medium on availability of a sufficient large contiguous free area in the data area. Then, the drive allocates the free area to the supplemental defect management area and adapts the file system and defect management tables on the recording medium accordingly. The adapted file system indicates the area or areas covered by the supplemental defect area, and the still available area for data. This embodiment has the advantage that most of the defect management activities are performed by the drive while the host still is in control and may decide on whether, and if yes, how much, the spare area should be enlarged.

In an embodiment of the invention, after the host receives the warning from the drive that a shortage is expected of the free space within the defect management area allocated so far, the host asks user input on the acceptance of the enlargement of the defect management area at the cost of the data area If the user accepts, this is communicated to the drive, and the drive will perform the necessary actions after the recording medium is unmounted by the host or during a background process.

The communication with the user may be a simple question whether the user allows an enlargement of the defect area or not. It is also possible to indicate to the user how much free space in the data area is available to support his decision in accordance with an embodiment of the invention. It is also possible that the user provides the amount of free space in the data area that is to be used to enlarge the defect management area.

In an embodiment of the invention, the host supplies the (or the relevant part of the) file system information to the drive to enable the drive to enlarge the defect management area. The drive need not be able to read the file system information itself.

In an embodiment of the invention, the drive itself is able to read the relevant file system information from the recording medium.

In an embodiment of the invention, the allocating step comprises a step of checking in the data area for a contiguous free part which has to become the supplemental defect management area. The supplemental defect management area is preferably a contiguous area to avoid that a defect area on the recording medium (usually an optical disc) has to be divided over several parts of a defect management area at different radial positions on the recording medium. The Jumping between different radial positions costs some time. This check allows using a free part of the data area wherever it is positioned. It is not required that this free part must be located at the end of the disc. It is not required to physically move data which is present at the end of the disc to allow the supplemental defect management area to be located at the end of the disc.

The defect table(s) in the defect management areas (DMA) is updated to take into account the allocated supplemental defect management area.

In an embodiment of the invention, the allocating further comprises updating the file system information such that a physical address area of a used part of the data area at the start or the end of the disc is coupled to a logical address area within the logical address area originally being coupled to the contiguous free part of the data area.

Before the supplemental defect management area is allocated, in the logical address area, a free area corresponds to the physical free area which is selected to become the supplemental defect management area. Further, the start or the end of the logical address area corresponds to the start or the end of the physical address area respectively.

After the supplemental defect management area is allocated, the start or the end of the logical address area is coupled to the physical supplemental defect management area which may not be allocated at the start or the end of the physical address area.

The file system information should be updated to be able to address the data at the start or the end of the physical address area This means that the logical addresses in the address area originally corresponding to the free data area now correspond to the start or the end of the physical address area. This is elucidated in more detail in FIG. 8.

Now, on the logical level seen by the host, a maximally large contiguous data area (without a hole because addresses have been taken out which are not to be used because they correspond to the supplemental defect management area) is available as is demanded by some applications. Thus, although the actual radial position on the disc of the free area may not be at the start or the end of the disc, the remapping performed provides a disc which at the logical level the host communicates with the drive, looks like a disc on which the free area which is converted to the supplemental defect area is at the start or the end of the disc. Consequently, the host can act as if the supplemental area is at the start or the end of the disc, while it actually is not. This has the advantage that it is not required to perform a time consuming movement of the data present at the start or the end of the disc.

The drive has to remap an error area on the disc such that the data to be stored in the error area is stored in the supplemental area at its actual radial position and not at the start or the end of the disc.

In an embodiment of the invention, the free area which is converted to the supplemental defect management area is physically moved to the start or the end of the disc by the drive. The time consuming copying of data is performed in the background, and the user will not get annoyed by having to wait a considerable time.

These and other aspects of the invention are apparent from and will be elucidated with reference to the embodiments described hereinafter.

In the drawings.

The same references in different Figs. refer to the same signals or to the same elements performing the same function.

Figure 1:
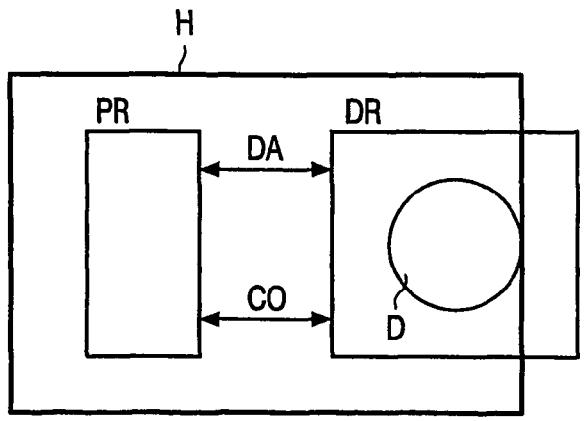
FIG. 1 shows a host and a standard drive in accordance with the invention.

FIG. 1 shows a host and a standard drive in accordance with the invention. The host H may be a standard personal computer (further referred to as PC) which comprises as drive DR a standard CD-drive or a standard DVD-drive. The drive DR is able to record information on an optical disc D when present in the drive DR. The PC comprises a processor PR which is coupled to the drive DR to exchange data DA and control signals CO between the processor PR and the drive DR. Other circuits (not shown) such as drive controllers and buffers may be present between the processor PR and the drive DR. A two way communication is possible between the processor PR and the drive DR to write data DA to disc D via the drive DR or to read data DA from the disc D via the drive DR, in the usual manner. As the drive DR is a standard component, the management of the amount of defect management area DMA (see FIG. 8) has to be present in the host H. The operation of this embodiment in accordance with the invention is elucidated with respect to the flowchart shown in FIG. 4.

Figure 2:
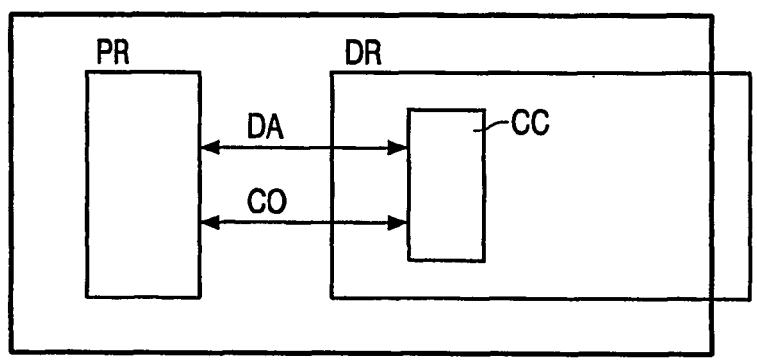
FIG. 2 shows a host and an adapted drive in accordance with the invention.

FIG. 2 shows a host and an adapted drive in accordance with the invention. The host H may be a PC which comprises as drive DR an adapted CD-drive or an adapted DVD-drive. Again, the drive DR is able to record information on an optical disc D when present in the drive DR. The PC comprises a processor PR which is coupled to the drive DR to transfer data DA and control signals CO between the processor PR and the drive DR. Other circuits (not shown) such as drive controllers and buffers may be present between the processor PR and the drive DR. A two way communication is possible between the processor PR and the drive DR to write data DA to disc D via the drive DR or to read data DA from the disc D via the drive DR in the usual manner. As the drive DR comprises a control circuit CC for performing the, or part of the defect management, all or part of the management of the amount of defect management area DMA is performed by the drive DR. The operation of embodiments in accordance with the invention which use an adapted drive are elucidated with respect to the flowcharts shown in FIGS. 5 to 7.

Figure 3:
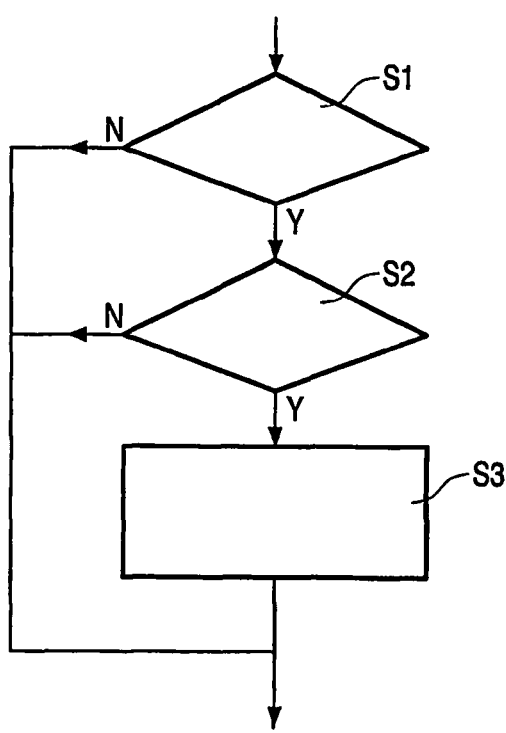
FIGS. 3 to 7 show flowcharts of embodiments of the method of allocating supplemental defect management.

FIG. 3 shows a flowchart of an embodiment of the method of allocating supplemental defect management area.

In step S1 the system of host H and drive DR checks whether a shortage of free space in the defect management area DMA is to be expected. For example, the shortage of this free space may be determined as the exact amount of bytes still free in the defect management area DMA. Or, the free space is indicated as a percentage of the total available amount of the defect management area DMA. Or, in the same manner as in EP-A-1014365, multi-bit flags may be stored on the disc D which indicate the amount of usage of the defect management area DMA (further referred to with DMA only).

Figure 8:
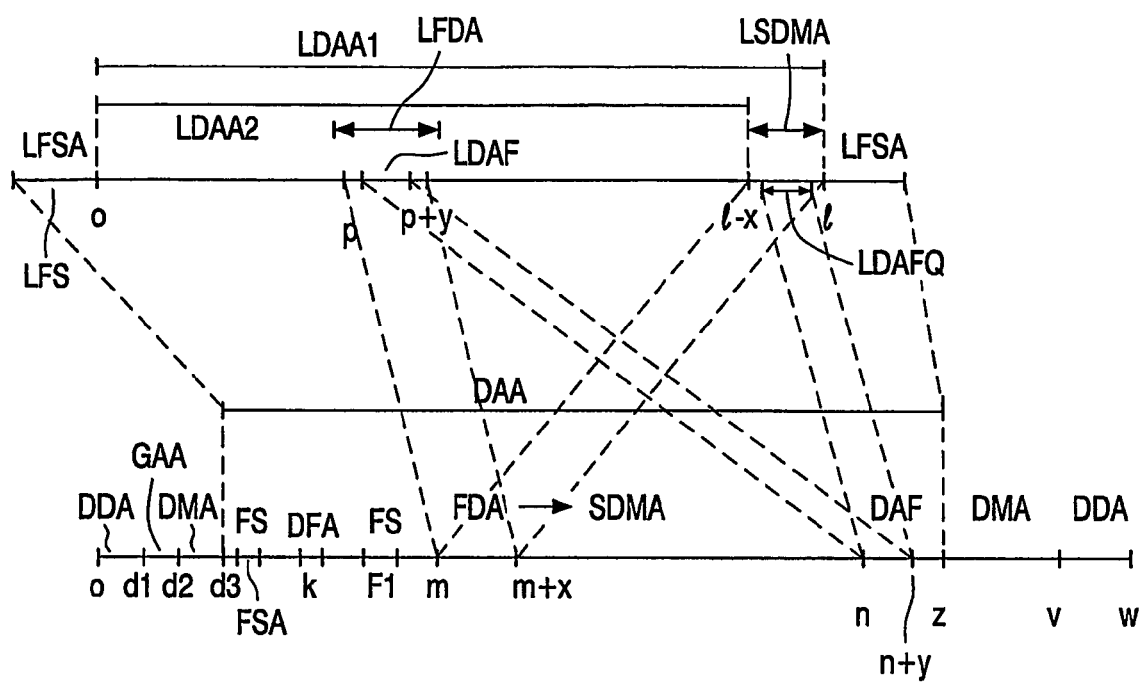
FIG. 8 shows an example of the physical arrangement of areas on the recording disc and the logical arrangement of the corresponding areas at the interface of the drive and the host.

If a shortage is detected in step 1, because, for example, the still free area in the DMA's is smaller than a predetermined number of bytes or a predetermined percentage, it is checked in step S2 whether it is possible to allocate supplemental defect management area (further referred to as SDMA) in the data area DAA (see FIG. 8). The data area DAA is accessible to store user data. It has to be checked in step S2 how many bytes are free in the data area DAA of the disc D. The location of the SDMA will depend on the amount and the location of free space in the data area DAA on the disc D, and on a location of the DMA's already present on the disc D.

The location and the size of the DMA's on a recording medium may depend on an agreement in the industry. A first example is to evenly distribute several DMA's over the disc to minimize the distance between a particular defect area DFA (see FIG. 8) on the disc D and the nearest DMA. This minimizes the time required to jump to a DMA. In such an existing DMA distribution (used on CD's), a desirable location of the SDMA is in-between two existing DMA's. The size of the SDMA preferably is in the same order as the existing DMA's. In a second example, the already present DMA's are located at the start and/or the end of the disc D to ensure an as large as possible contiguous data area DAA. In such an existing DMA distribution (used on DVD discs), a desirable location of the SDMA is at the end or the start of the disc D to keep the contiguous data area DAA as large as possible.

The availability and the position of a free space area FDA (see FIG. 8) in the data area DAA is another issue. In principle it is possible to use a free space area FDA whatever its position on the disc D is. The drive D is able to remap the free space area FDA to whatever logical address is required at the interfacing between the host H and the drive DR. After the remapping, the host H sees the free space area FDA on the drive DR at the logical level the host communicates with the drive DR at the desired position. The drive DR translates the address at the logical level to the actual physical position on the disc D. By moving data if this data is in the area the free space should be allocated, it is possible to create the free space at the particular location required. However moving data costs relatively much time and preferably is done by the drive DR when the drive DR is not used and the host H is not hampered by the moving of the data.

If the SDMA is allocated in size and position, in step S3, the file system information FS on the disc D is amended during the adaptation period which is related to the mounting or unmounting phase of the drive DR. Usually, the file system information FS is present in a file system area FSA and in the data area DAA.

The file system information FS has to be amended such that the free data area available to store user data is adapted to reflect that the still free data area decreases with the amount the SDMA covers.

The mounting phase of the drive DR is the phase when the host H starts communication with the drive to make the content of the disc D inserted in the drive DR available to the host H. When the disc D is mounted, the host H has read the file system information FS stored on the disc D and the host H is able to write data DA to or to read data DA from the disk D.

The unmounting phase of the drive DR is the phase wherein the host H stops the communication with the drive DR. When the disc D is unmounted, the host H is not anymore directly able to access the file system information FS of the disc D and is unable to write data DA to or to read data DA from the disc D. The disc D will be unmounted when the user uses the eject button of the drive DR directly or via software to eject the disc D.

In accordance with the invention, the SDMA is managed during the mounting or the unmounting phase. This is far more often than in the prior art EP-A-1014365 where the size of the SDMA is determined only once during an initializing phase (which is the formatting phase). The SDMA management in accordance with the invention has the advantage that the management of the size and the position of the SDMA's is much more flexible as it is able to take the actual amount of free data space into account as it evolves during the use of the disc D. It is even possible to decrease the amount of reserved SDMA if this enables to store a data file which otherwise would not fit.

No SDMA is allocated if in step S1 no shortage of free space in the DMA area allocated so far is detected, or if in step S2 is detected that no free space FDA in the data area DAA is present.

Figure 4:
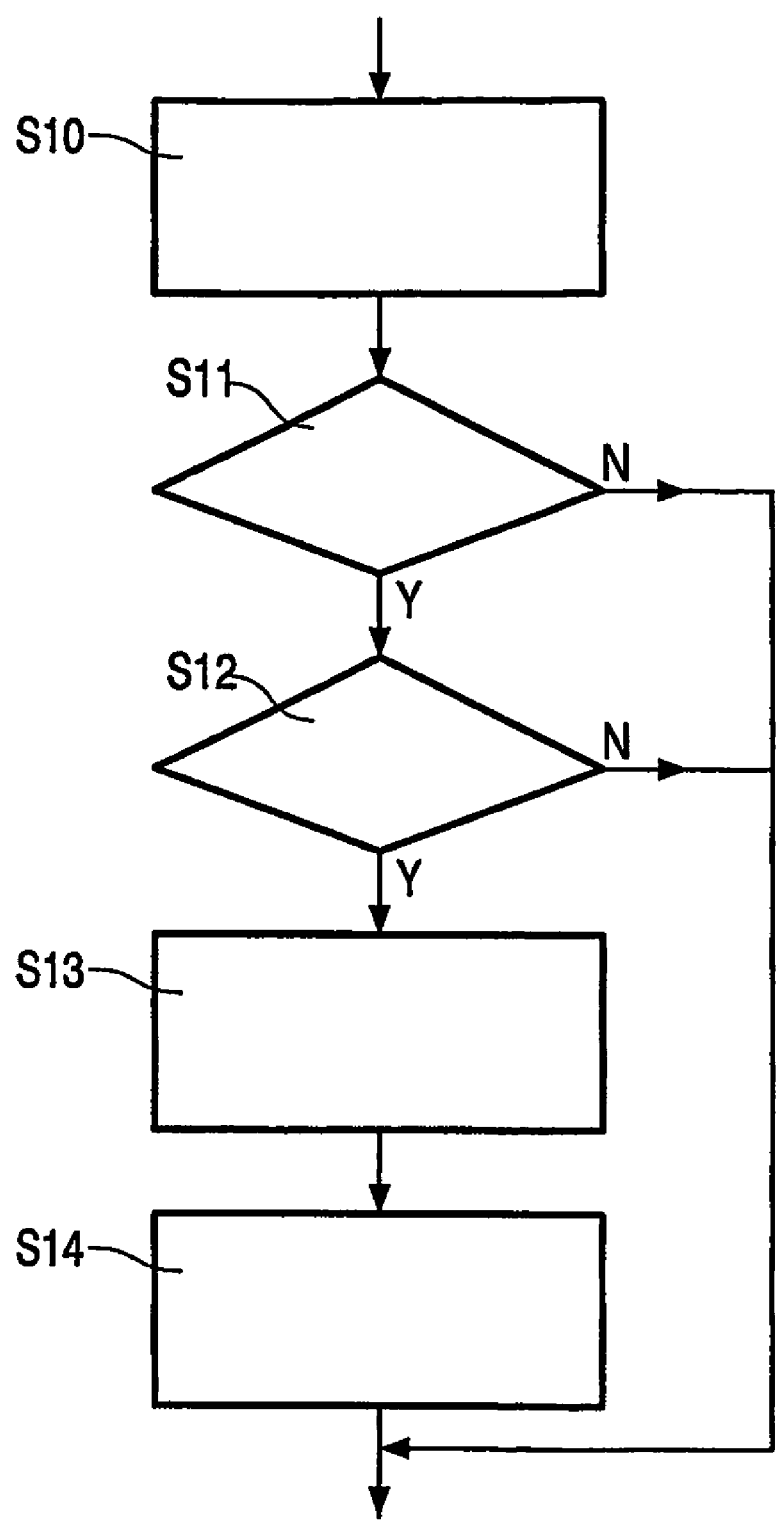

FIG. 4 shows a flowchart of an embodiment of the method of allocating supplemental defect management area. In this embodiment, the host H manages the whole process of allocating supplemental defect management area (SDMA). This allows a standard drive DR to be used.

First, in step S10, the host H mounts the disc D to be able to access the disc D. In step S11, the host checks whether a shortage of free space in the existing DMA's is expected. In step S12, the host H checks whether sufficient free area FDA in the data area DAA is available at what position to allocate a desired amount of SDMA. In step S13, the host H allocates the desired amount of SDMA in the free area FDA of the data area DAA. In step S14, the host H adapts the file system FS in the file system area FSA to be in line with the new situation.

No SDMA is allocated if in step S11 no shortage of free space in the DMA area allocated so far is detected, or if in step S12 is detected that no free space FDA in the data area DAA is present.

Although it is an advantage that the host H which has the intelligence on-board manages the allocation of the SDMA, and a standard drive DR can be used, it is a disadvantage that the host H has to spend a lot of time on this process which in part or totally could be performed by the drive DR. In the embodiment of the invention shown in FIG. 5, the drive DR performs the whole process, in the embodiments of the invention shown in FIGS. 6 and 7, both the host H and the drive DR perform part of the process.

Figure 5:
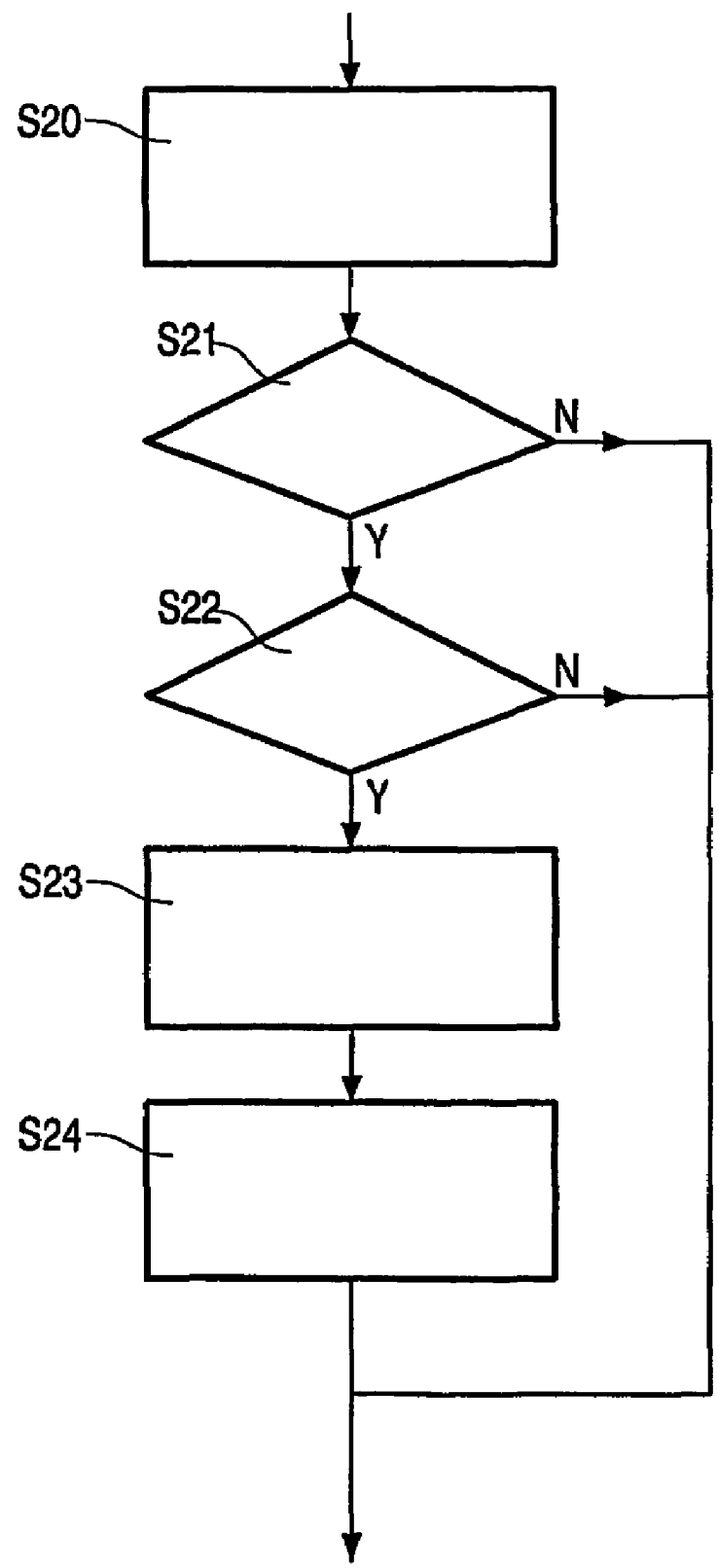

FIG. 5 shows a flowchart of an embodiment of the method of allocating supplemental defect management area. After the host H unmounts the disc D in step S20, in step S21, the drive DR checks in DMA tables recorded on the disc D whether a shortage of free space in the existing DMA's is expected to occur. The drive DR, when the disc D is in the unmounted state, may start such a check automatically, for example periodically on a regular time scheme, or when a mount command from the host H is detected. In the latter situation, the drive DR performs first all the steps for allocating the SDMA, before it allows the host H to mount and reach the disc D. In step S22, the drive DR checks for sufficient free space FDA in the data area DAA, and allocates the required amount of SDMA in this free space FDA in step S23. In step S24, the drive DR adapts the file system to the new situation.

No SDMA is allocated and the file system SF will not be updated if in step S21 no shortage of free space in the DMA areas allocated so far is detected, or if in step S22 is detected that no free space FDA in the data area DAA is present.

It is an advantage of this approach that the host H does not need to spend any time on the management of the SDMA. The extra intelligence has to be present in the controller CC of the drive DR.

Figure 6:
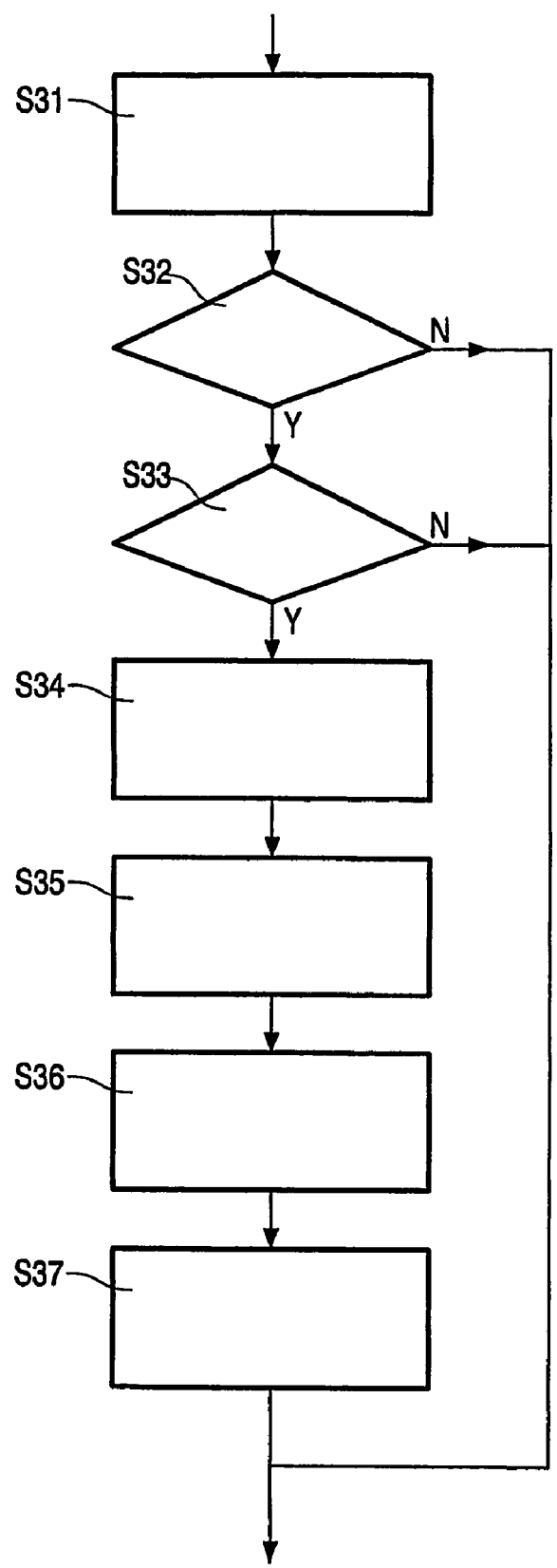

FIG. 6 shows a flowchart of an embodiment of the method of allocating supplemental defect management area. In step S31, the host H mounts the disc D to be able to access the disc D. In step S32, the host H checks whether the shortage of free space in the DMA's is expected. In step S33, the host H checks whether and where sufficient free contiguous space in the data area is present. In step S34, the host H communicates to the drive DR where how much of the free data area FDA should be used to allocate the SDMA. In step S35, the host H unmounts the disc D. In the further steps, the host H is not involved anymore and may perform other tasks. In step S36, the drive DR actually allocates the SDMA, and in step S37, the drive DR adapts the file system information FS on the disc D. It is also possible that the host H adapts the file system information FS.

No SDMA is allocated if in step S32 no shortage of free space in the DMA area allocated so far is detected, or if in step S33 is detected that no free space FDA in the data area DAA is present, and the host will unmount the disc D in step S35, and the steps S36 and S37 will not be performed.

Figure 7:
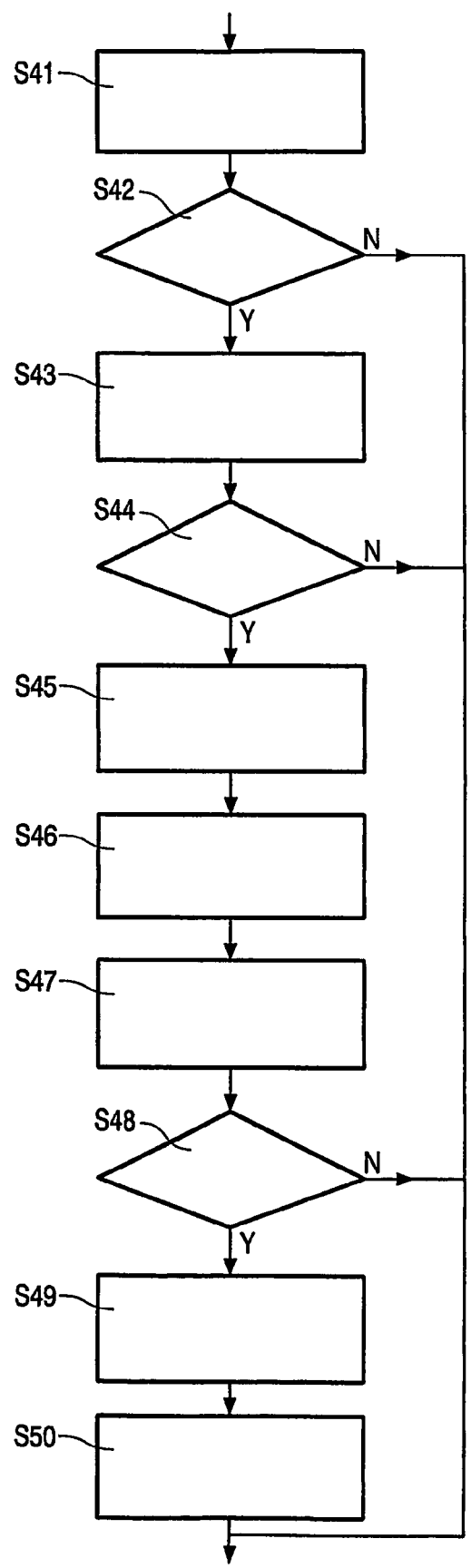

FIG. 7 shows a flowchart of an embodiment of the method of allocating supplemental defect management area. In step S41, the host H mounts the disc D to be able to access the disc D. In step S42, the drive DR checks whether the shortage of free space in the DMA's is expected. In step S43, the drive DR indicates to the host H that the shortage is expected.

In the optional step S44, the host H asks the user whether he wants to have the DMA's enlarged. It might also be asked by how much. It is possible to indicate to the user how many free data area is still present, to support the decision. Depending on the decision of the user, SDMA will or will not be allocated in the further steps.

In the optional step S45, the host H may supply the relevant file system information FS to the drive DR, if the drive DR is unable to read the file system information FS from the disc DR itself.

In step S46, the host H indicates to the drive DR that it is allowed to extend the DMA's. In step S47, the host H unmounts the disc D. In step S48, the drive DR checks whether and where sufficient free contiguous space FDA in the data area DAA is present. In step S49, the drive DR allocates the SDMA, and in step S50, the drive DR adapts the file system FS on the disc D, or communicates it to the host.

No SDMA is allocated and the file system FS will not be updated if in step S42 no shortage of free space in the DMA area allocated so far is detected, or if in step S44 the user indicates that no SDMA should be allocated, or if in step S48 is detected that no free space FDA in the data area DAA is present, and the process may jump to the end of the flowchart.

In this embodiment in accordance with the invention, the drive DR performs most activities to allocate the SDMA, and the host H controls whether the SDMA is allowed to be allocated and how large the SDMA should be. It is possible to omit the steps S44 wherein the user input is requested, the host may autonomously decide on the allocation and size of the SDMA. If the drive DR is unable to read the file system information FS stored on the disc D, in the optional step S45, the host H provides the file system information FS to the drive DR to enable the drive DR to perform the step S48.

FIG. 8 shows an example of the physical arrangement of areas on the recording disc and the logical arrangement of the corresponding areas at the interface of the drive and the host.

The upper line indicates the positions of areas on the logical level the host H communicates with the drive DR. The lower line indicates the positions of the areas on the physical level wherein a particular position corresponds to a particular radial position on the disc D.

Firstly, the situation is described before the supplementary defect management area (SDMA) is allocated. In this example, on the physical level, from the left (the inner side of the disc D at the boundary with the spindle hole) to the right (the outer side of the disc D) the next areas are allocated: a disc definition area DDA from position 0 to d1, a general application area GAA from position d1 to d2, an already available defect management area DMA from position d2 to d3, and a data area DAA wherein the user-data may be stored from position d3 to z, a further already available defect management area DMA from position z to v, and an optional further disc definition area DDA. Finally, file system information FS is available in a file system area FSA and an extra file F1 in the data area DAA. This allocation of areas is an example of a DVD disc. The allocation of areas may be different.

In this example, it is assumed that data DAF (for example, a file) starting at the position n and ending at the position n+y is present in the physical data area DAA. A free contiguous data area FDA which can be used as supplemental defect management area (SDMA) is present from the position m to m+x. The size of the FDA is too large to be allocated at the end of the disc D because the data file DAF occupies too much space at the end of the disc D. Further, a defective area DFA is present at the position k.

These areas may originally be directly (in a linear way) coupled to the addresses on the logical level. Areas on the logical level which correspond to associated areas on the disc D have the same reference preceded by a letter "L". The free data area FDA which is selected to become the supplemental defect management area SDMA originally corresponds to the logical address area LFDA. The data file DAF originally corresponds to the logical address area LDAFO.

The linear coupling has the disadvantage that after the free data area FDA on the disc D is converted into SDMA, the logical addresses in the area LFDA corresponding to the physical addresses m to m+x, occur in the middle of the logical data area LDAA1. This causes a hole in the logical address space which in some applications is undesirable or even unacceptable. In such applications, it is necessary to have the logical addresses LSDMA for the SDMA at the start or the end of the logical address space, such that a contiguous logical data area LDAA2 is available after the allocation of the SDMA on the disc D. After allocation of the SDMA, the logical addresses occupied by the LSDMA are taken out from the logical data area LDAA1 as they are no longer available to write or read user data. On the logical level, the logical data area LDAA2 will extend now from the addresses 0 to 1-x.

If however, as shown in this example, the free space FDA in the data area DAA is not available at the physical end of the disc D because data DAF is present at the end of the disc D, the conversion table has to be updated to perform a conversion between the logical addresses and the physical addresses of the SDMA.

In this example, after the SDMA is allocated in the free area FDA, the table for management of the DMA's (which include the SDMA) is updated. This defect management table is usually present in the defect management areas DMA's and may be present in the disc definition area DDA. The defect management table indicates where defective areas DFA on the disc D occur and where in the DMA's these defective areas DFA are reallocated such that an attempt to read data from or write data to the defective area DFA is redirected to the proper area in the DMA's. As an example, a defective area DFA at the physical position k is redirected by this table to the DMA area allocated from physical position d2 to d3.

The file system information FS has to be updated such that the host requests updated addresses when it wants to access the data DAF at the physical addresses n to n−y. The original logical address area LFDAO is now occupied by the SDMA. Thus, the file system information has to be updated such that the logical addresses LDAF points to the physical address area DAF. In this manner, the data DAF which is physically present at the end of the disc D is still accessible by the host H.

Consequently, on the logical level, from the left (lowest address or logical sector) to the right (highest address), the following areas are present. A file system area LFSA up to logical address 0. A data area LDAA1 which starts at the logical address 0 and ends at the address 1, before the SDMA is allocated. A data area LDAA2 which starts at the logical address 0 and ends at the logical address 1-x, after the SDMA is allocated. A data file LDAF from logical address p to p+y which corresponds to the data file DAF on the physical level from address n to n+y, and a file system area LFSA at the end.

In a preferred embodiment, when the disc D is mounted, as background process, the drive DR copies the data DAF to another physical position, which allows the SDMA to be copied to the physical end of the disc D. Preferably, the data DAF is copied in small batches, such that the host has fast access to the disc D when required, and such that the disc will be promptly ejected when the user activates the eject button. This has the advantage that the time consuming copying process is performed when the drive DR is not in use. The user will not be annoyed by the copying process.

It should be noted that the above-mentioned embodiments illustrate rather than limit the invention, and that those skilled in the art will be able to design many alternative embodiments without departing from the scope of the appended claims.

For example, the areas on the disc D may have different positions than shown. The optical disc is an example only, the invention can be applied to recording mediums in general. The format of the disc may be differ from the format shown, different areas may be present.

In the claims, any reference signs placed between parentheses shall not be construed as limiting the claim. The word "comprising" does not exclude the presence of elements or steps other than those listed in a claim. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of accessing a recording medium comprising a data area and a defect management area, in a system comprising a drive for writing data to or reading data from the recording medium, and a host for sending data to or for receiving data from the drive when the recording medium is in a mounted state wherein file system information is available to the host, the method comprising the acts of:

detecting whether a shortage of free space in the defect management area is to be expected,
   allocating supplemental defect management area at the cost of the data area when the shortage has been detected, and
   adapting the file system information to reflect a latest state of availability of the data area and the allocated supplemental defect management area, during an unmounting phase wherein the host unmounts the disc, wherein the drive performs the adapting after the host unmounted the recording medium.

2. The method of accessing a recording medium as claimed in claim 1, wherein the host performs the detecting for providing information to the drive comprising an indication of a usage of free space in the defect management area allocated so far, and of a free area in the data area which can be allocated to become the supplemental defect management area, the information being supplied to the drive at a start of the unmounting phase, the drive performing the allocating after the host unmounted the recording medium.

3. The method of accessing a recording medium as claimed in claim 1, wherein the drive further performs the detecting for evaluating the file system information recorded on the recording medium after the host unmounted the recording medium.

4. The method of accessing a recording medium as claimed in claim 1, wherein the drive performs the detecting, the drive further comprises communicating to the host that the shortage has been detected, the host further comprises deciding on whether the defect management area should be enlarged or not, and if yes, indicating to the drive that the defect management area should be enlarged, and unmounting the recording medium, the drive further checks the file system information on availability of a sufficient large contiguous free area in the data area, and the drive performs the allocating and the adapting.

5. The method of accessing a recording medium as claimed in claim 4, wherein the host provides the file system information to the drive before the unmounting.

6. The method of accessing a recording medium as claimed in claim 1, wherein the allocating further comprises checking the data area to allocate a contiguous free part of the data area, wherever available, to become the supplemental defect management area by updating a defect table in the defect management areas accordingly.

7. The method of accessing a recording medium as claimed in claim 6, wherein the allocating further comprises updating the file system information such that a physical address area of a used part of the data area at the start or the end of the disc is coupled to a logical address area within the logical address area originally being coupled to the contiguous free part of the data area.

8. The method of accessing a recording medium as claimed in claim 7, wherein the drive further comprises copying the supplemental defect management area if not physically allocated at the start or the end of the disk to the start or the end of the disk during a background process when the disc is mounted and is not in use by the host.

9. A recording medium comprising a disc definition area in which information is recorded indicating that it is allowable to perform the method as claimed in claim 1 on the recording medium.

10. A method of accessing a recording medium comprising a data area and a defect management area, in a system comprising a drive for writing data to or reading data from the recording medium, and a host for sending data to or for receiving data from the drive when the recording medium is in a mounted state wherein file system information is available to the host, the method comprising the acts of:
    detecting whether a shortage of free space in the defect management area is to be expected,
    allocating supplemental defect management area at the cost of the data area when the shortage has been detected, and
    adapting the file system information to reflect a latest state of availability of the data area and the allocated supplemental defect management area, during an unmounting phase wherein the host unmounts the disc;
    wherein the drive further comprises communicating to the host that the shortage has been detected, the host further comprises deciding on whether the defect management area should be enlarged or not, and if yes, indicating to the drive that the defect management area should be enlarged, and unmounting the recording medium, the drive further checks the file system information on availability of a sufficient large contiguous free area in the data area, and the drive performs the allocating and the adapting, and wherein in-between the communicating and the unmounting, the host asks input from a user whether enlargement of the defect management area at the cost of the data area is acceptable, and the host indicates to the drive that the defect management area should be enlarged, only if the user indicated to do so.

11. The method of accessing a recording medium as claimed in claim 10, wherein the host further determines an amount of the contiguous free space available, and indicates this amount to the user.

12. A method of accessing a recording medium comprising a data area and a defect management area, in a system comprising a drive for writing data to or reading data from the recording medium, and a host for sending data to or for receiving data from the drive when the recording medium is in a mounted state wherein tile system information is available to the host, the method comprising the acts of:
    detecting whether a shortage of free space in the defect management area is to be expected,
    allocating supplemental defect management area at the cost of the data area when the shortage has been detected, and
    adapting the tile system information to reflect a latest state of availability of the data area and the allocated supplemental defect management area, during an unmounting phase wherein the host unmounts the disc;
    wherein the drive further comprises communicating to the host that the shortage has been detected, the host further comprises deciding on whether the defect management area should be enlarged or not, and if yes, indicating to the drive that the defect management area should be enlarged, and unmounting the recording medium, the drive further checks the file system information on availability of a sufficient large contiguous free area in the data area, and the drive performs the allocating and the adapting, and wherein the drive reads the file system information from the recording medium after the unmounting.

13. An apparatus for accessing a recording medium comprising a data area and a defect management area, the apparatus comprising:
    a drive for writing data to or reading data from the recording medium,
    a host for sending data to or for receiving data from the drive when the drive is in a mounted state wherein file system information is available to the host,
    means for detecting whether a shortage of free space in the defect management area is to be expected,
    means for allocating supplemental defect management area at the cost of the data area when the shortage has been detected, and
    means for adapting the file system information to reflect a latest state of availability of the data area and the allocated supplemental defect management area, during an unmounting phase wherein the host unmounts the recording medium, wherein the drive performs the adapting after the host unmounted the recording medium.

* * * * *